(12) United States Patent  
Hieda

(10) Patent No.: US 6,693,240 B2  
(45) Date of Patent: Feb. 17, 2004

(54) MOUNTING DEVICE FOR HOOD RELEASE LEVER

(75) Inventor: Takayuki Hieda, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/361,760

(22) Filed: Feb. 11, 2003

(65) Prior Publication Data

US 2003/0150637 A1 Aug. 14, 2003

(30) Foreign Application Priority Data

Feb. 12, 2002 (JP) ........................................ 2002-033769

(51) Int. Cl.[7] ................................................. H02G 3/14
(52) U.S. Cl. ........................ 174/66; 174/67; 220/241; 220/242
(58) Field of Search ............................... 174/66, 67, 57; 220/241, 242; D8/353; D13/152; 362/95

(56) References Cited

U.S. PATENT DOCUMENTS

| | | | | |
|---|---|---|---|---|
| 5,485,356 A | * | 1/1996 | Nguyen ........................ 362/95 |
| 5,895,888 A | * | 4/1999 | Arenas et al. ................. 174/66 |
| 5,900,584 A | * | 5/1999 | Cady et al. .................... 174/66 |
| 6,037,541 A | * | 3/2000 | Bartley et al. ................. 174/66 |
| 6,452,100 B1 | * | 9/2002 | Marcinek ....................... 174/66 |
| 6,512,177 B2 | * | 1/2003 | Kosuge .......................... 174/66 |
| 6,593,531 B2 | * | 7/2003 | Hülsmann et al. ............. 174/66 |

* cited by examiner

*Primary Examiner*—Dhiru R Patel  
(74) *Attorney, Agent, or Firm*—Greenblum & Bernstein P.L.C.

(57) ABSTRACT

A lever mounting portion is formed on a junction box to be accommodated inside an instrument panel. A hood release lever is fixed to the lever mounting portion of the junction box by merely sliding the hood release lever on the lever mounting portion and accommodated in the instrument panel. An opening is formed on a passenger compartment side outer surface of the instrument panel at a position where the junction box is accommodated. A decorative plate for closing the opening is removably provided. The opening that is exposed by removing the decorative plate therefrom is used to accomplish maintenance of the junction box and operate the hood release lever.

16 Claims, 8 Drawing Sheets

MOUNTING DEVICE FOR HOOD RELEASE LEVER

BACKGROUND OF THE INVENTION

1. Field of the Invention

The present invention relates to a device for mounting a hood release lever. More particularly the present invention relates to a device for mounting a hood release lever on a junction box to be accommodated in an instrument panel.

2. Description of the Related Art

To open a hood or bonnet B covering an engine compartment shown in FIG. 10, a hood release lever 1, installed at the lower end of an instrument panel I adjacent the driver's seat, is pulled as shown in FIG. 9A. The hood may be opened to perform maintenance, for example.

As shown in FIG. 9B, the hood release lever 1 is rotatably mounted with a screw 3 on a bracket 2 projecting from the lower surface of the instrument panel I. A transmission wire 4 is wired from the passenger compartment X to the engine compartment Y. When a user pulls the hood release lever 1 toward him/her, the hood B is opened through the transmission wire 4.

However, in the above described construction, it is necessary to provide the instrument panel I with the bracket 2 for the hood release lever 1 and to attach the bracket 2 with the screw 3. Thus, the conventional construction necessitates an increase in the number of manufacturing processes.

Further since the hood release lever 1 projects below the instrument panel I on the driver's side, the hood release lever 1 interferes with the driver's comfort and safety and is not the preferred appearance for the instrument panel.

SUMMARY OF THE INVENTION

The present invention has been made in view of the above described situation. Accordingly, it is an object of the present invention to simplify the method of installing the hood release lever on the junction box and to improve the appearance of the instrument panel.

To achieve the objects, according to the present invention, there is provided a device for mounting a hood release lever for opening a hood or bonnet of a vehicle on a junction box to be accommodated inside an instrument panel. A lever mounting portion is formed on the junction box, and the junction box is accommodated inside the instrument panel, with the hood release lever fixed to the lever mounting portion. An opening is formed on a passenger compartment side outer surface of the instrument panel at a position where the junction box is accommodated, and a decorative plate for closing the opening is removably installed. The opening that is exposed by removing the decorative plate therefrom is used to accomplish maintenance of the junction box and operate the hood release lever.

In the above described construction, the hood release lever is accommodated inside the instrument panel and cannot be seen. Thus the hood release lever is not an interference in the passenger compartment and preferable in the appearance thereof. Further it is unnecessary to install the bracket on the instrument panel to install the hood release lever on the junction box, unlike the conventional art.

Further when it is necessary to operate the hood release lever, the decorative plate is removed from the opening formed on the outer surface of the instrument panel. Thereby the hood release lever exposed in the opening can be operated. Since the opening and the decorative plate are also used for maintenance of the junction box, an additional element is unnecessary.

The junction box is positioned in such a way that a front side thereof on which fuses and relays are mounted faces the opening; a recess having the lever mounting portion is formed at a lower end of the junction box; a slide frame is formed on the lever mounting portion at a front side thereof; and a hooking bar extending across the recess is formed on a rear surface of the junction box. A slide projection is formed on a front side of the hood release lever; and a hook is erect on an upper surface of a rear side of the hood release lever. The slide projection of the hood release lever is slidably inserted into the slide frame of the lever mounting portion, and the hood release lever is locked by hooking the hook to the hooking bar.

In the above described construction, the hood release lever can be installed on the junction box by one touch, namely, by merely sliding the hood release lever on the lever mounting portion. Thus the mounting operation can be accomplished in a simplified manner.

After installing the hood release lever on the junction box, the hood release lever is held by the slide frame at the front side of the junction box. The hook is locked to the hooking bar at the rear side of the junction box. Thus the hood release lever can be fixed to the junction box reliably.

Further, the lever mounting portion is provided in the recess disposed at the lower end of the junction box. Thus by installing the hood release lever inside the recess, it is possible to prevent the hood release lever from projecting from the junction box and hence the hood release lever is not an interference.

An aspect of the present invention provides a structure for mounting a hood release lever on a junction box accommodated inside an instrument panel in a vehicle; the device including a lever mounting portion provided on the junction box, the junction box positioned inside the instrument panel and the hood release lever fixed to the lever mounting portion; an opening provided on a passenger compartment side outer surface of the instrument panel at a position where the junction box is positioned; and a plate removably provided in the opening; wherein the opening is exposed by removing the plate therefrom and the opening is used to accomplish maintenance of the junction box and to operate the hood release lever.

According to a further aspect of the present invention, the junction box is positioned in the instrument panel so that a front side thereof on which fuses and relays are mounted faces the opening, the structure further including a recess provided at a lower end of the junction box that receives the lever mounting portion; a slide frame provided on the lever mounting portion at a front side thereof; a hooking bar extending across the recess provided on a rear surface of the lever mounting portion; a slide projection provided on a front side of the hood release lever and a hook extending from an upper surface of a rear side of the hood release lever; and wherein the slide projection of the hood release lever is slidably inserted into the slide frame of the lever mounting portion, and the hood release lever is locked by hooking the hook to the hooking bar.

According to a further aspect of the present invention, the hood release lever may further include a body portion; and a tiltable lever mounted on the body portion. The body portion may further include a T-shaped upper surface portion facing the lever mounting portion, and the slide projection projects from the upper surface portion. The hook may be configured in a curved shape that curves from the rear side of the hood release lever toward the front side of the hood release lever and the slide projection.

In a further aspect of the present invention, the body portion may include a projecting portion; and the tiltable lever may include a recess therein that receives the projecting portion; a shaft connecting the projecting portion and the recess; and a grip portion; wherein to operate the hood release lever, the grip portion is pulled by an operator such that the tiltable lever rotates around the shaft. Further, the plate may include first and second locking pieces projecting from a rear surface of the plate, the first and second locking pieces locking the plate to edges of the opening. The first locking piece may project from an upper end of the plate, the second locking piece may project from a lower end of the plate, and the first and second locking pieces lock the plate to the junction box by engaging an upper edge and a lower edge, respectively, of the opening. The first and second locking pieces may be configured in an L-shape in cross-section; and the first locking piece may be configured to taper into a point for removal of the plate from the opening.

A further aspect of the present invention provides a junction box for accommodation inside an instrument panel in a vehicle, the junction box including a case, a recess provided at a lower end of the case, and a lever mounting portion provided in the recess at the lower end of the case, the lever mounting portion configured to receive a hood release lever. The junction box may further include a slide frame provided on the lever mounting portion at a front side thereof, and a hooking bar extending across the recess provided on a rear surface of the lever mounting portion, wherein the slide frame and the hooking bar are configured to receive a hood release lever. Further, the hood release lever may include a slide projection provided on a front side thereof and a hook extending from an upper surface of a rear side thereof, wherein the slide projection of the hood release lever is slidably inserted into the slide frame of the lever mounting portion, and the hood release lever is locked by hooking the hook to the hooking bar. The junction box may further include a relay accommodation portion and a fuse accommodation portion provided on a front side of the case, and a plurality of brackets projecting from an upper end of the case.

In a further aspect of the present invention, the junction box includes a mounting frame provided in the lever mounting portion, the mounting frame inclined downwardly toward a rear surface of the lever mounting portion, an opening provided in lower surface of the mounting frame, a cutout provided in a central portion of a front surface of the mounting frame, a slide frame provided on the mounting frame at a front side thereof, the slide frame including a pair of L-shaped portions provided on either side of the cutout, and a hooking bar provided on a rear surface of the mounting frame, wherein the mounting frame is configured to receive a hood release lever.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment of the present invention will be described below with reference to the drawings.

Figure 7:
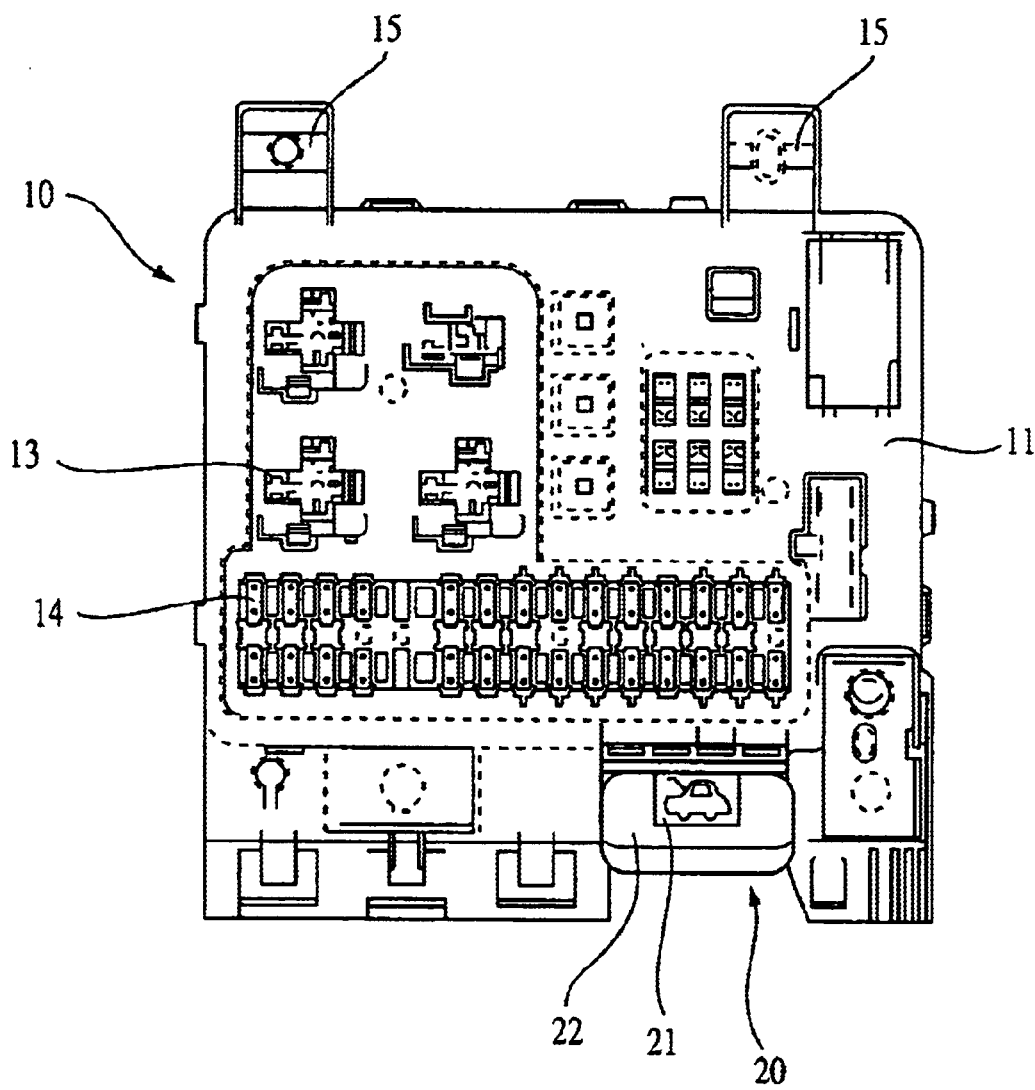
FIG. 7 is a front view showing the junction box on which the hood release lever of FIG. 5 has been installed.

As shown in FIG. 7, a hood release lever 20 is fixed to a junction box 10 and accommodated inside an instrument panel I, together with the junction box 10.

Figure 1:
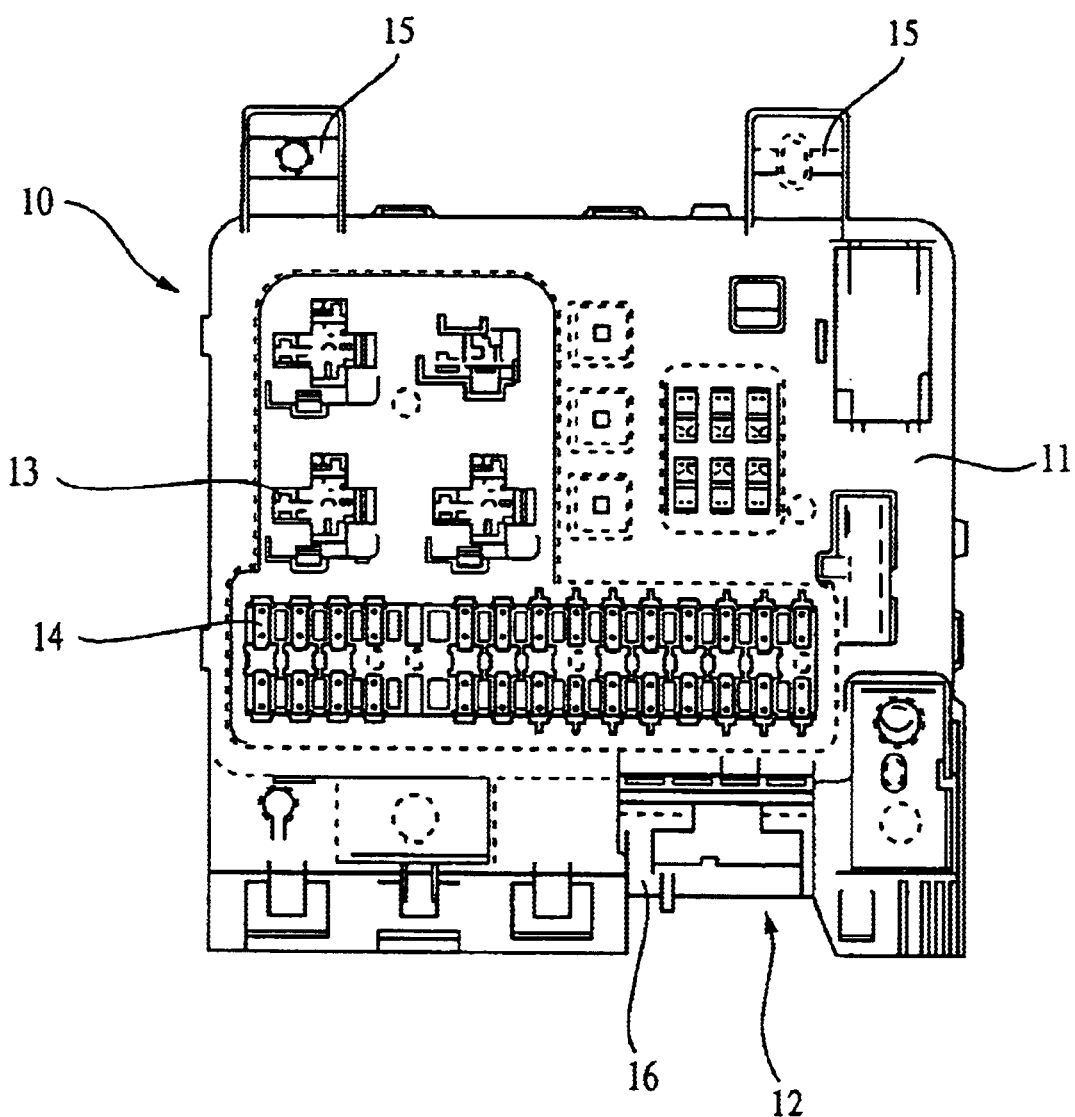
FIG. 1 is a front view showing a junction box according to an embodiment of the present invention.
Figure 2:
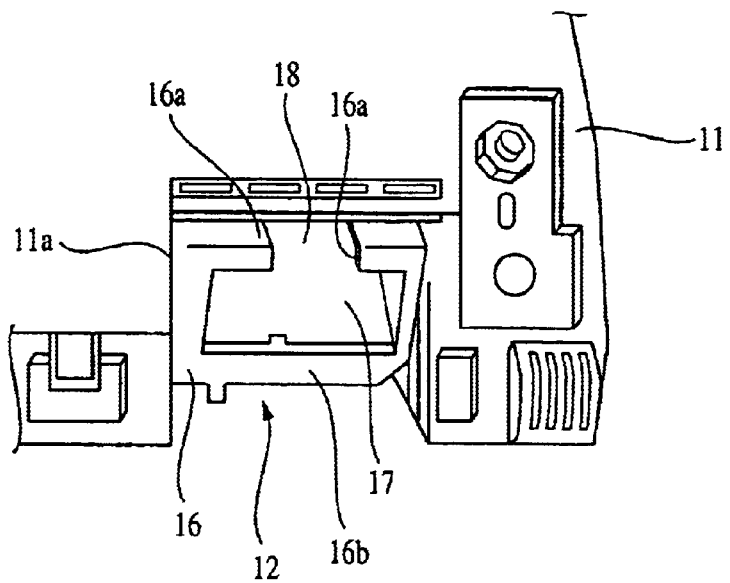
FIG. 2 is an enlarged front view showing main portions of the junction box of FIG. 1.

As shown in FIG. 1, the junction box 10 has a relay accommodation portion 13 and a fuse accommodation portion 14 on a front side of a case 11. Brackets 15 are projectingly formed at the upper end of the case 11. As shown in FIG. 2, a lever mounting portion 12 for the hood release lever 20 is formed in a recess 11a provided at the lower end of the case 11.

Figure 3:
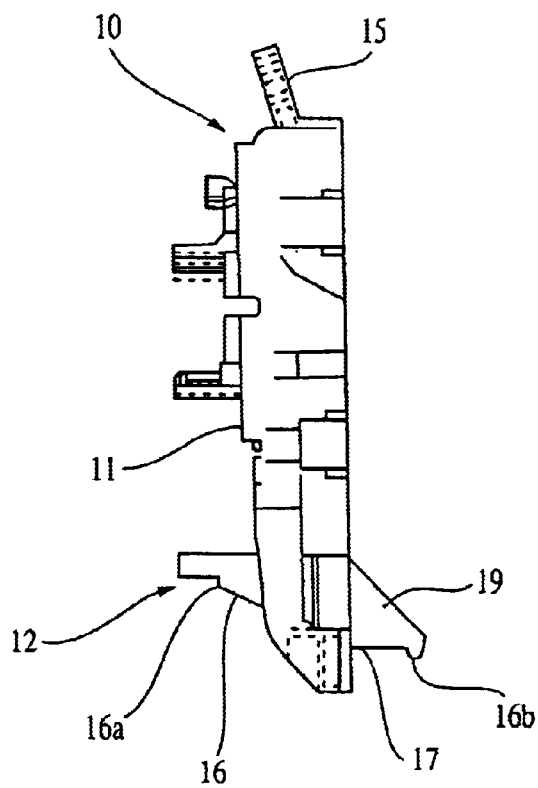
FIG. 3 is a side view showing the junction box of FIG. 1.
Figure 4:
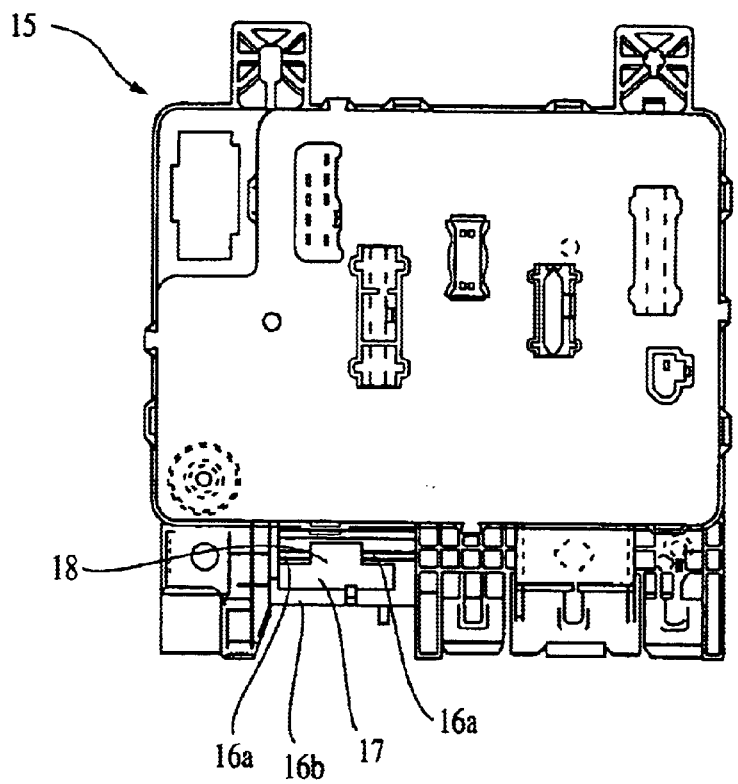
FIG. 4 is a rear view showing the junction box of FIG. 1.
Figure 5:
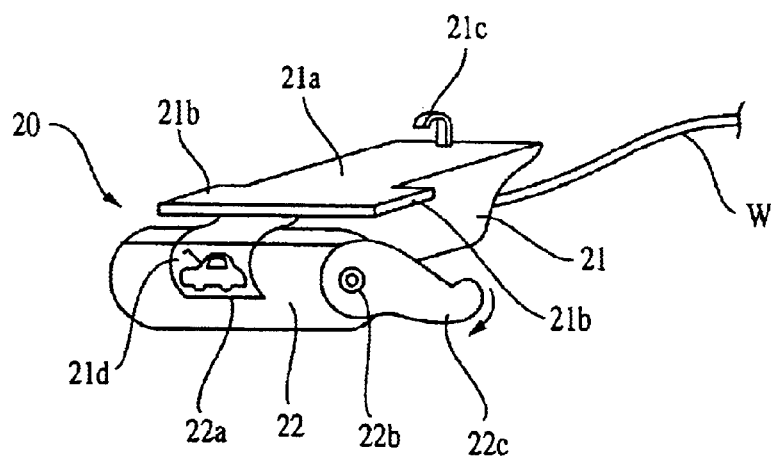
FIG. 5 is a perspective view showing a hood release lever according to an embodiment of the present invention.

More specifically, as shown in FIGS. 2 through 4, the lever mounting portion 12 has an mounting frame 16 inclined downwardly toward a rear surface thereof, an opening 17 formed by cutting a lower surface of the mounting frame 16 in a substantially quadrilateral shape, a cutout 18 formed by cutting out the central portion of a front surface of the mounting frame 16, a slide frame 16a having an L-shaped cross-section provided at both sides of the cutout 18, and a hooking bar 16b formed on the rear surface of the mounting frame 16.

The hood release lever 20 has a tiltable lever 22 mounted on a body portion 21 thereof fixed to the lever-installing portion 12 of the junction box 10.

The body portion 21 has a T-shaped upper surface portion 21a which faces the lever mounting portion 12, a slide projection 21b provided at the front side of the upper surface portion 21a and projecting in left-hand and right-hand directions, a hook 21c projecting in a curved shape from a rear edge of the upper surface portion 21a, and a projecting portion 21d projecting forward from the front edge of the body portion 21.

The lever 22 has a recess 22a to be fitted in the projecting portion 21d of the body portion 21, a grip portion 22c to be pulled by the user, and a shaft 22b for mounting the recess 22a and the projecting portion 21d on each other.

Inside the shaft 22b, there is provided a rewinding coil spring (not shown) for returning the lever 22 to its original position when the lever 22 is tilted on its shaft 22b by pulling the grip portion 22c. The body portion 21 is provided with a transmission wire W for transmitting the tilting operation of the lever 22.

The procedure of installing or mounting the hood release lever 20 on the junction box 10 will be described below.

Figure 6A:
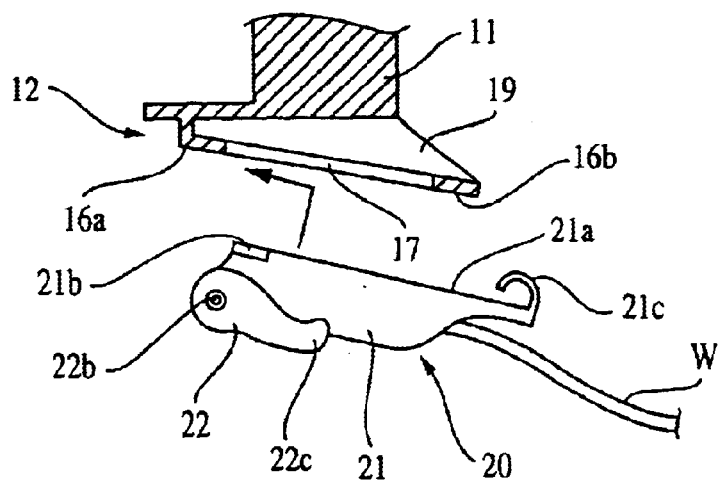
FIGS. 6A and 6B are side views showing the procedure of installing the hood release lever on the junction box of FIG. 1.
Figure 6B:
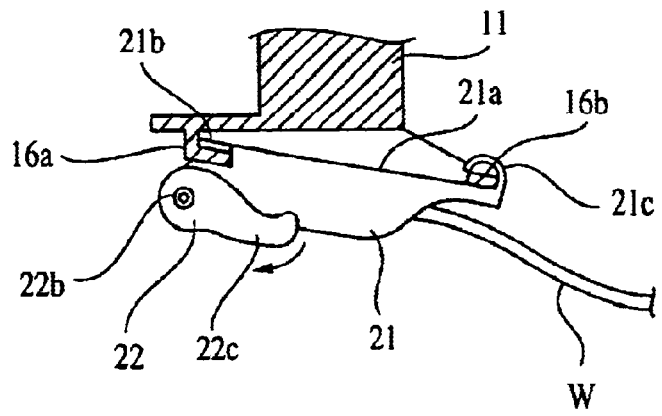

As shown in FIGS. 6A and 6B, in a state in which the hood release lever 20 is provided below the lever mounting portion 12, as shown with an arrow, the slide projection 21b of the hood release lever 20 is slidably inserted into the slide frame 16a from the opening 17 of the mounting frame 16. At the same time, the hood release lever 20 is fixed to the mounting frame 16 at its front and rear sides by hooking the hook 21c of the hood release lever 20 on the hooking bar 16b of the mounting frame 16 through an opening 19 formed on the rear surface of the junction box 10.

By fixing the hood release lever 20 to the lever mounting portion 12 of the junction box 10, as shown in FIG. 7, the hood release lever 20 is accommodated in the recess 11a provided at the lower end of the case 11 of the junction box 10 and does not project from the case 11. Thus the hood release lever 20 is not an interference. In this state, the hood release lever 20 is accommodated inside the instrument panel I together with the junction box 10, as shown in FIG. 8.

Figure 8A:
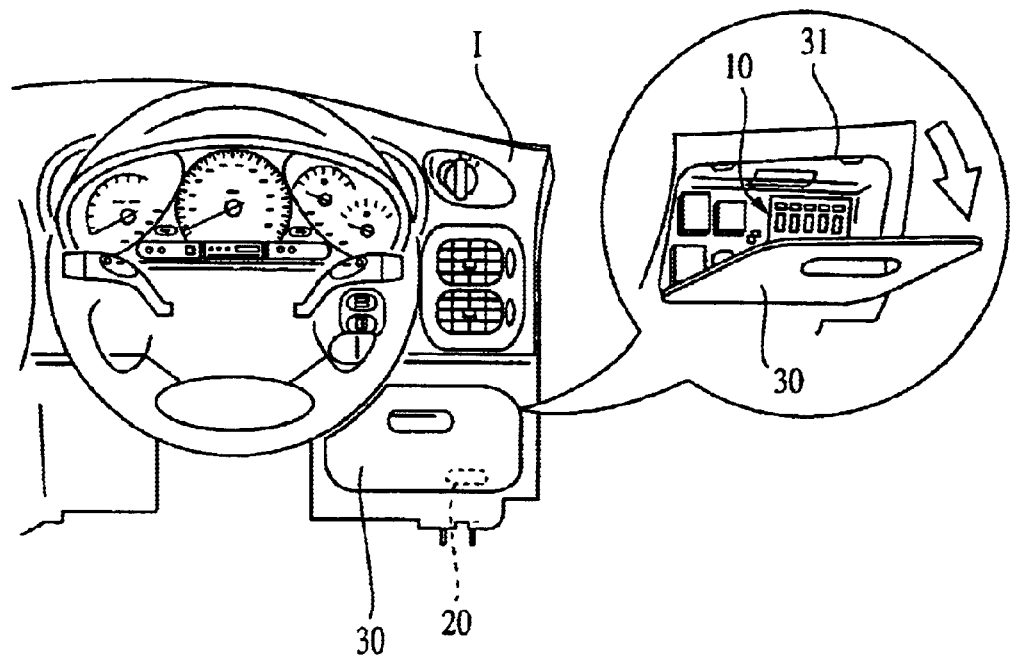
FIGS. 8A and 8B show the junction box having the hood release lever installed therein of FIG. 7 accommodated inside an instrument panel.

As shown in FIG. 8A, an opening 31 is formed on the outer surface of the instrument panel I at a position where the junction box 10 is provided, and a decorative plate 30 is provided to cover the opening 31.

Figure 8B:
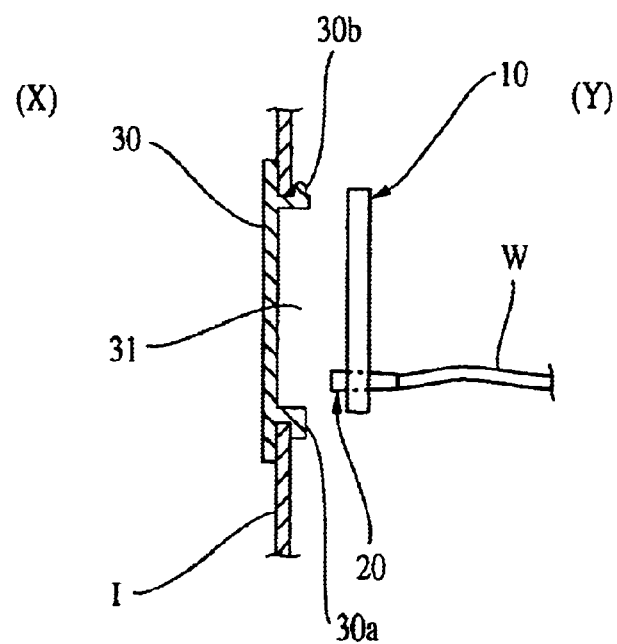
Figure 9A:
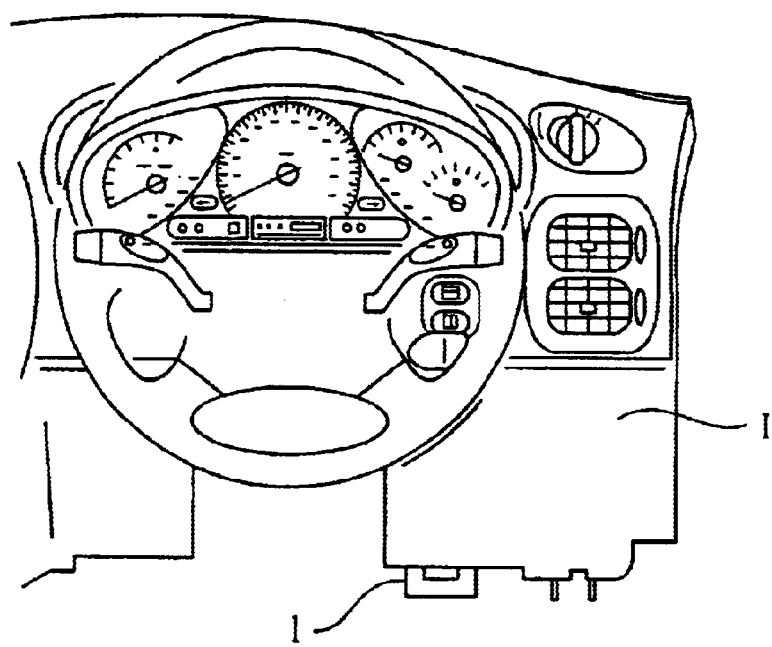
FIGS. 9A and 9B show a conventional hood release lever installed on a junction box.
Figure 9B:
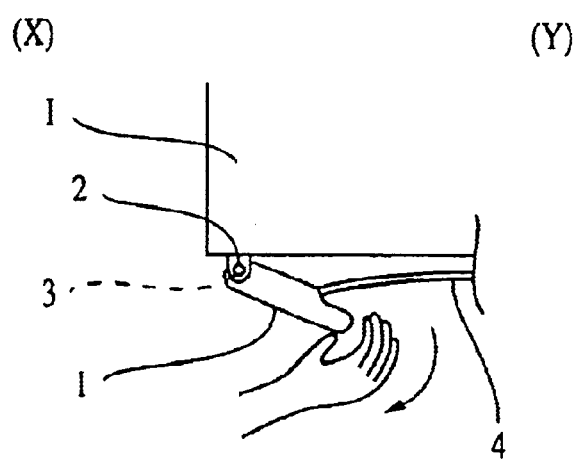
Figure 10:
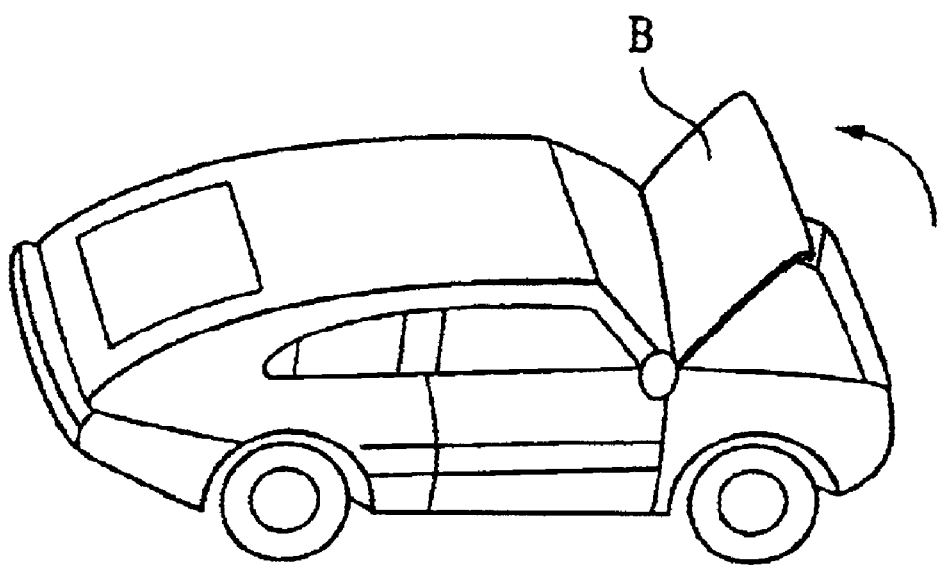
FIG. 10 shows a conventional hood of a vehicle opened or closed.

As shown in FIG. 8B, locking pieces 30a and 30b both L-shaped in cross-section are projectingly formed on upper and lower ends of the rear surface of the decorative plate 30. The decorative plate 30 is locked to the opening 31 by locking the locking pieces 30a and 30b to upper and lower edges of the opening 31 respectively. The upper end of the upper locking piece 30b is tapered off to a point to remove the decorative plate 30 from the opening 31.

By removing the decorative plate 30 from the opening 31, maintenance of the junction box 10 can be accomplished through the opening 31, and a hood B can be opened by pulling the lever 22 of the hood release lever 20.

The above described construction eliminates the need for forming a bracket on the instrument panel I and for using a screw and allows the hood release lever 20 to be mounted on the junction box 10 easily by one touch. Hence an increased maneuverability is obtained.

Further the hood release lever 20 is accommodated in the instrument panel I, with the hood release lever 20 fixed to the junction box 10. Therefore the instrument panel 1 has a pleasing appearance. When it is necessary to operate the hood release lever 20, it can be operated by removing the decorative plate 30 that is used for the maintenance of the junction box 10 from the opening 31.

The means for fixing the hood release lever 20 to the junction box 10 is not limited to the above described method of slidably inserting the slide projection 21b into the slide frame 16a and hooking the hook 21c to the hooking bar 16b, but any fixing methods capable of locking the hood release lever 20 to the junction box 10 by one touch can be adopted.

As apparent from the foregoing description, according to the present invention, the hood release lever is accommodated inside the instrument panel and cannot be seen. Thus the hood release lever is not an interference in the passenger compartment and is preferable in appearance. Further, it is unnecessary to mount a bracket on the instrument panel to install the hood release lever on the junction box, unlike the conventional art.

Further the hood release lever exposed in the opening can be operated by removing the decorative plate that is used for maintenance of the junction box.

The hood release lever can be installed or mounted on the junction box by one touch by merely sliding the slide projection and the hook on the slide frame and the hooking bar of the lever mounting portion. Thus it is possible to eliminate an operation of attaching a lever by screws or the like and hence simplify the work of installing the lever.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. 2002-033769, filed on Feb. 12, 2002, which is herein expressly incorporated by reference in its entirety.

What is claimed is:

1. A structure for mounting a hood release lever on a junction box accommodated inside an instrument panel in a vehicle; said structure including:

a lever mounting portion provided on said junction box, said junction box positioned inside said instrument panel and said hood release lever fixed to said lever mounting portion;

an opening provided on a passenger compartment side outer surface of said instrument panel at a position where said junction box is positioned; and a plate removably provided in said opening;

wherein said opening is exposed by removing said plate therefrom and said opening is used to accomplish maintenance of said junction box and to operate said hood release lever.

2. The structure according to claim 1, wherein said junction box is positioned in said instrument panel so that a front side thereof on which fuses and relays are mounted faces said opening, said structure further including:

a recess provided at a lower end of said junction box that receives said lever mounting portion;

a slide frame provided on said lever mounting portion at a front side thereof;

a hooking bar extending across said recess provided on a rear surface of said lever mounting portion;

a slide projection provided on a front side of said hood release lever and a hook extending from an upper surface of a rear side of said hood release lever; and wherein said slide projection of said hood release lever is slidably inserted into said slide frame of said lever mounting portion, and said hood release lever is locked by hooking said hook to said hooking bar.

3. The structure according to claim 2, wherein said hood release lever further includes:

a body portion; and a tiltable lever mounted on said body portion.

4. The structure according to claim 3, wherein said body portion includes a T-shaped upper surface portion facing said lever mounting portion, and said slide projection projects from said upper surface portion.

5. The structure according to claim 4, wherein said hook is configured in a curved shape that curves from said rear side of said hood release lever toward said front side of said hood release lever and said slide projection.

6. The structure according to claim 3, wherein said body portion includes a projecting portion; and said tiltable lever includes;
   a recess therein that receives said projecting portion;
   a shaft connecting said projecting portion and said recess; and
   a grip portion;
   wherein to operate the hood release lever, the grip portion is pulled by an operator such that the tiltable lever rotates around said shaft.

7. The structure according to claim 1, wherein said hood release lever further includes:

a body portion; and a tiltable lever mounted on said body portion.

8. The structure according to claim 1, wherein said plate includes first and second locking pieces projecting from a rear surface of said plate, said first and second locking pieces locking said plate to edges of said opening.

9. The structure according to claim 8, wherein said first locking piece projects from an upper end of said plate, said second locking piece projects from a lower end of said plate, and said first and second locking pieces lock said plate to said instrument panel by engaging an upper edge and a lower edge, respectively, of said opening.

10. The structure according to claim 9, wherein said first and second locking pieces are configured in an L-shape in cross-section.

11. The structure according to claim 10, wherein said first locking piece is configured to taper into a point for removal of said plate from said opening.

12. A junction box for accommodation inside an instrument panel in a vehicle, said junction box comprising:

a case;

a recess provided at a lower end of said case; and a lever mounting portion provided in said recess at said lower end of said case, said lever mounting portion configured to receive a hood release lever, said lever mounting portion includes a mounting frame inclined downwardly toward a rear surface of said lever mounting portion.

13. The junction box according to claim 12, said junction box further comprising:

a slide frame provided on said lever mounting portion at a front side thereof; and a hooking bar extending across said recess provided on a rear surface of said lever mounting portion;

wherein said slide frame and said hooking bar are configured to receive said hood release lever.

14. The junction box according to claim 13, wherein the hood release lever includes a slide projection provided on a front side thereof and a hook extending from an upper surface of a rear side thereof;

wherein the slide projection of the hood release lever is slidably inserted into said slide frame of said lever mounting portion, and the hood release lever is locked by hooking the hook to said hooking bar.

15. The junction box according to claim 12, said junction box further comprising:

a relay accommodation portion and a fuse accommodation portion provided on a front side of said case; and a plurality of brackets projecting from an upper end of said case.

16. The junction box according to claim 12, said junction box further comprising:

an opening provided in lower surface of said mounting frame;

a cutout provided in a central portion of a front surface of said mounting frame;

a slide frame provided on said mounting frame at a front side thereof, said slide frame including a pair of L-shaped portions provided on either side of said cutout; and a hooking bar provided on a rear surface of said mounting frame;

wherein said mounting frame is configured to receive said hood release lever.

* * * * *